Dec. 5, 1950  O. VAN LEER ET AL  2,532,971
METHOD AND APPARATUS FOR PRODUCING OPTICAL COATINGS
Filed April 12, 1947  2 Sheets-Sheet 1

INVENTORS
OSCAR VAN LEER
MORRIS A. ZOOK, JR.
BY
Lyle Dillon
ATTORNEY

Dec. 5, 1950     O. VAN LEER ET AL     2,532,971
METHOD AND APPARATUS FOR PRODUCING OPTICAL COATINGS
Filed April 12, 1947     2 Sheets-Sheet 2
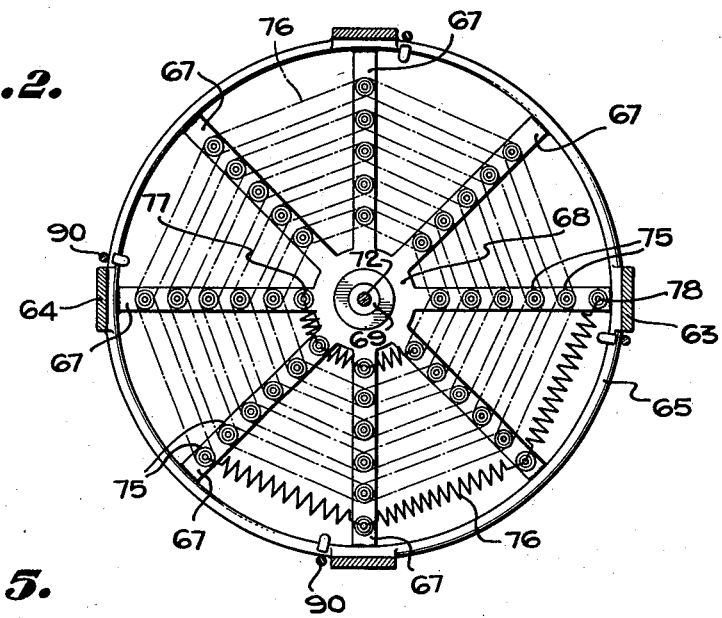
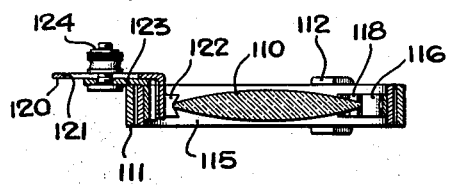
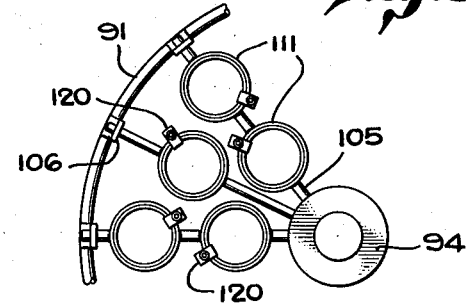
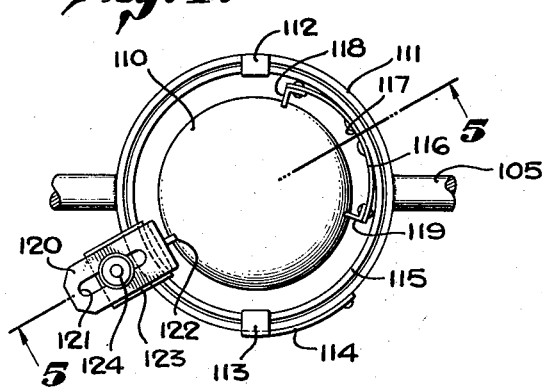
INVENTORS
OSCAR VAN LEER
MORRIS A. ZOOK, JR.
BY Lyle Dillon
ATTORNEY Patented Dec. 5, 1950

2,532,971

UNITED STATES PATENT OFFICE 2,532,971

METHOD AND APPARATUS FOR PRODUCING OPTICAL COATINGS

Oscar van Leer, Tujunga, and Morris A. Zook, Jr., Rosemead, Calif., assignors, by mesne assignments, to Pacific Universal Products Corporation, Pasadena, Calif., a corporation of California Application April 12, 1947, Serial No. 741,110

3 Claims. (Cl. 117—106)

This invention relates generally to the art of thermal evaporative coating in vacuum and more particularly to an improved process and apparatus for forming transparent films of improved quality on optical surfaces for the purpose of modifying their light reflectivity and transmission characteristics.

It is now well known that the reflectivity and transmission characteristics of an optical element can be modified by the deposition on its optical surface of a transparent layer of a suitable substance having a thickness in the order of a wave length of light and having a refractive index different from that of the optical element material. Where the desired effect is that of minimizing reflectivity and increasing the transmission for a given wave length of light it has been shown by John Strong (Optical Society of America V. 26, P. 73, January 1936), Cartwright and Turner U. S. Patent Re. 22,076 and others, that where a single film thickness is employed, it should have a thickness of one-quarter of the wave length for which the minimum reflection is desired and a refractive index equal to the geometric mean between that of the optical element upon which the film is formed and that of the surrounding medium in contact with the exposed surface of the film.

No material has been found which exactly meets all the requirements under all conditions for an ideal coating material for glass, optical elements to be employed in contact with the atmosphere, particularly for reduction of surface reflection, for the reason that none has been found with a refractive index sufficiently low and at the same time possessing the required transparency and the desired mechanical qualities. Materials which have been found to most nearly meet the desired requirements are various metallic halides such as the fluorides of sodium, lithium, calcium and magnesium and certain mixtures thereof, but coatings of these materials have in general had the disadvantage of insufficient durability. Coatings of these materials have heretofore exhibited characteristics of insufficient tenacity and hardness and excessive susceptibility to moisture and other detrimental atmospheric effects which have unsuited them for use where such coatings must be exposed to the atmosphere or be handled and frequently cleaned and otherwise subjected to abrasion as, for example, in connection with spectacle lenses.

Many processes have been suggested for improving the physical characteristics of such coatings. For example Cartwright Re. 22,076 suggests the use of a deposited, thin, protective overlayer of quartz or zircon; Lyon 2,398,382 discloses baking the layer of metallic fluoride during and after deposition to increase its ruggedness, and Richards 2,391,595 describes an involved process including the employment of a plurality of superimposed different layers of such materials subjected to a prolonged electronic bombardment.

While some of those suggested treatments such as the baking process appear to be effective in somewhat improving the hardness and durability of these deposited films, they do not alone succeed in effecting the degree of improvement in film quality desired nor do they appear to recognize or eliminate a probable major cause of the initial lack of durability of such films particularly those deposited upon double optical surfaces such as those of lenses and spectacle glasses.

It is therefore an object of this invention to provide an improved method and means for coating objects, particularly the optical surfaces of light transmitting or reflecting bodies such as flats, prisms, lenses and reflectors.

It is a further object of this invention to provide a process and means for coating optical surfaces with coatings of improved hardness, durability, tenacity and general resistance to deterioration.

It is a particular object of this invention to provide a method and apparatus for, in effect, simultaneously coating both sides of an optical element from a single source of coating material vapors.

It is a still further object of this invention to provide a method and apparatus for forming improved optical coatings simultaneously on oppositely facing surfaces of optical elements from a single source of coating materials.

It has been found that where an optical element such as for example, a lens having opposite optical surfaces to be coated, is placed in a vacuum chamber and coated first on one surface and then turned over in the chamber and a second coating formed on the other surface in a manner such as, for example, that shown and described in McLeod 2,260,471 or Dimmick 2,408,614, and others, certain effects detrimental to the quality of the resulting coatings occur. The second coating formed on the surface initially facing away from the coating vapor source is found to be materially inferior to the first coating thus formed on the surface initially facing the coating vapor source, and the coating first formed is also found to be inferior to that which is initially formed thereon prior to the reversal of the position of the element for deposition of the second coating.

The reasons for the before-mentioned results are not entirely understood but it is believed that possibly one or both of the following contributing detrimental effects occur:

The first detrimental effect may be related to the well known fact that in the process of evaporative coating in high vacuum the major portion of the vapors appear to radiate in straight lines from the source point of emission to the target surface being coated. It is also recognized that a minor portion of the emitted vapors do not reach the target area by a direct free path but become diffused by collision with residual gas molecules in the evacuated chamber and that a certain portion of such diffuse vapors reach the target surface and other surfaces of the object by an indirect path to form a so-called inadvertent or secondary deposit. This effect appears particularly noticeable upon the surface of the object, opposite to that facing the vapor source, where the entire coating, if any, necessarily consists of only the inadvertent or secondary deposit. When the optical element is then turned after completion of the coating of the first surface to expose the other surface (carrying the previously deposited indirect or inadvertent deposit) to the direct vapors, the coating formed on the surface is then apparently deposited upon the previously formed inadvertent coating, with the result that the bond between the resulting coating and the optical surface appears to be weak and the coating as a whole lacks hardness and durability.

The second of the before-mentioned effects may possibly be due to the expulsion of gases or other constituents from the body of the optical element with their absorption or accumulation on or resultant alteration of the characteristics of the optical surface in a manner detrimental to the bond or quality of the subsequently deposited coating. This latter effect appears to be most pronounced on the surface initially facing away from or shielded from the direct vapor source, possibly for the reason that sufficient time is permitted during the deposition of the first coating to allow the accumulation of such effect in considerable degree on that surface before any direct deposit is initiated. That this latter effect probably occurs, at least to an appreciable extent, appears to be supported by the discovery that shielding or masking-off of the surface opposite to that upon which direct deposition is initially performed, to thereby prevent any inadvertent or indirect deposit thereon, does not entirely overcome or eliminate this said latter detrimental effect.

Heretofore, for the reasons hereinbefore mentioned, it has been necessary before the object or optical element upon which the first coating had been completed could be reversed in position in the vacuum chamber for deposition of a second coating on the opposite side, to break the vacuum in the chamber, remove the object or optical element therefrom and subject the surface upon which the second coating was to be deposited to a suitable cleaning process for removing the inadvertent deposit or for eliminating the other before-mentioned effects and then replace the thus cleaned element in the chamber with the cleaned surface facing the source of vapors and the coating process then continued. The resultant inefficiency of the latter process is obvious, and furthermore, during this later depositing step unless other means are provided for preventing it, an undesirable inadvertent coating is formed over the previously deposited layer.

It has been discovered that if the object to be coated on several different surfaces is continuously shifted in position, as, for example, in the case where the object is to be coated on both sides is a lens and it is continuously turned over or rotated so as to alternately expose the opposite sides or opposite optical surfaces thereof in moderately rapid succession, the inadvertent deposit or other detrimental effects are prevented from accumulating in quantity on any one side of the lens and are apparently, in effect, sufficiently uniformly intermixed with the direct coating to reduce greatly if not substantially to eliminate all detrimental effects.

It has been further discovered that direct exposure of the surface undergoing direct coating to radiant heat continuously or intermittently during the coating deposition time interval is advantageous in minimizing any detrimental effect of the intermixed inadvertent deposit and in hardening and forming a more durable and tenacious coating layer.

With the foregoing objects and discoveries in view, this invention resides generally in a method of and an apparatus for, substantially simultaneously coating opposite or different sides of an element such as the opposite optical surfaces of an optical element, from a single source of vapors in vacuum wherein the said element is moved or rotated to expose alternately, repeatedly and in relatively rapid succession the separate or opposite surfaces to be coated to the direct vapors from the vapor source. The invention also includes the direct exposure of the deposited surface layers to radiant heating.

The foregoing and other objects, advantages and features of novelty will be evidenced hereinafter.

In the drawings which show by way of illustration a preferred embodiment of the invention and in which like reference characters designate the same or similar parts throughout the several views:

Figure 2 is a cross-sectional view taken on line 2—2 of Figure 1 showing the arrangement of the heating element.

Figure 3 is a fragmentary cross-sectional view taken on line 3—3 of Figure 1, showing a number of the holders for elements to be coated.

Figure 4 is a fragmentary detailed view of one of the element holders of Figure 3, and Figure 5 is a cross-sectional view taken on line 5—5 of Figure 4.

Figure 1:
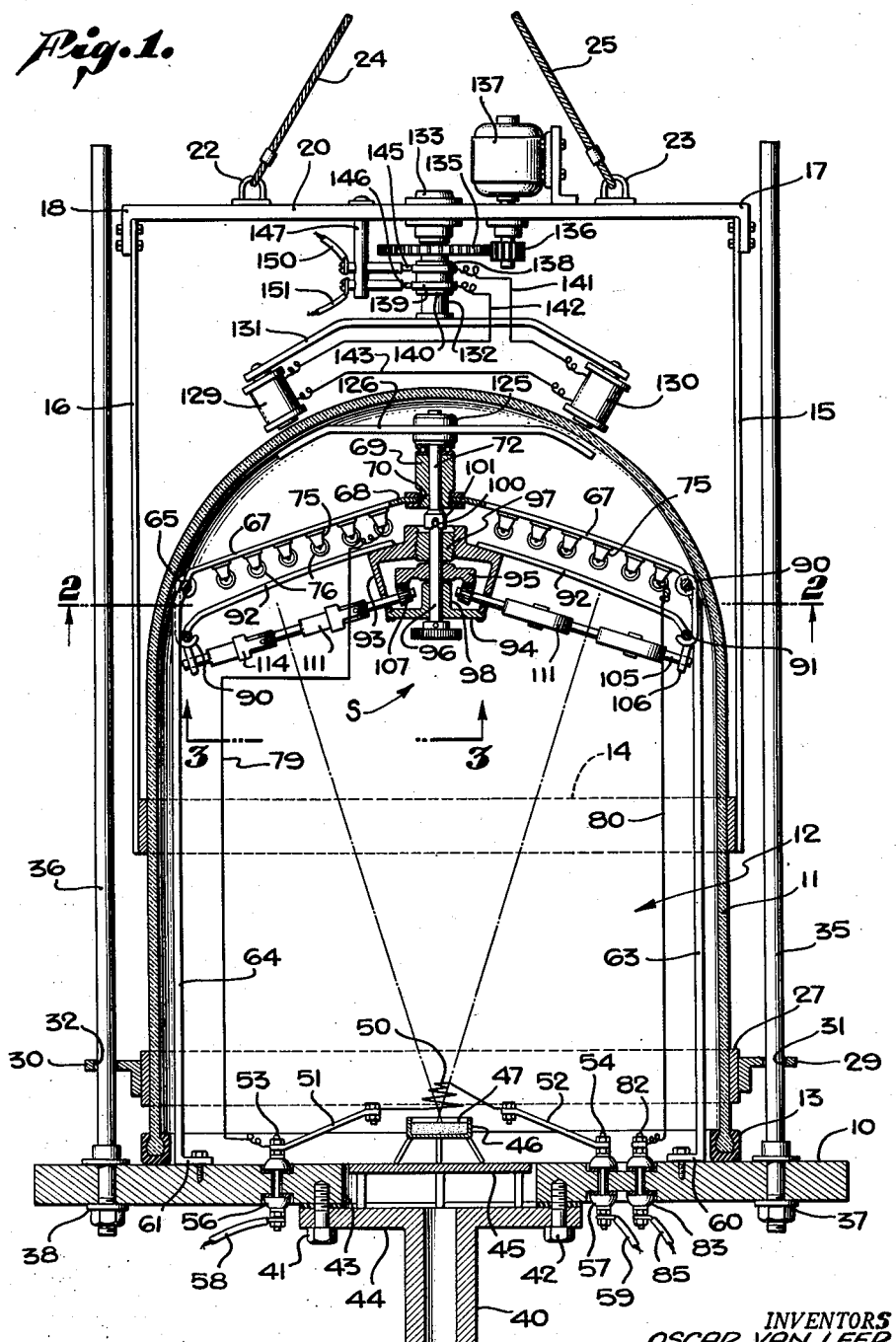
Figure 1 is a sectional elevation of the general assembly of the apparatus.

Referring now primarily to Figure 1, a rigid metal base plate 10 is provided, upon which the open end of a bell jar 11 is adapted to seat and be closed thereby to form a vacuum chamber 12. A channel shaped gasket 13 made of suitable resilient material such as rubber or neoprene is carried on the beaded edge of the mouth of the bell jar 11 and serves both as a cushion support and a gas tight sealing means between the bell jar 11 and the base 10. An encircling metal band 14 is fixed in clamping engagement about the mid section of the bell jar 11. A pair of upright, supporting members 15 and 16 extend upwardly from points of connection at diametrically opposite sides of the band 14 and make connection with the respective outer ends 17 and 18 of a horizontally positioned supporting yoke member 20. The yoke member 20 is provided on its upper surface with a pair of spaced eyes 22 and 23 to which are attached a pair of supporting ropes or cables 24 and 25. The ropes or cables 24 and 25 are adapted to pass over suitable pulleys to a counterweight (not shown).

A second metal band 27 is clamped about the lower end portion of the bell jar 11 and this band carries a pair of guide members 29 and 30. The guide members 29 and 30 are provided with guide openings 31 and 32 adapted to make sliding fit respectively upon vertical guide rods 35 and 36 which are attached at their lower ends as shown at 37 and 38 to the base plate 10. The bell jar 11 is thus adapted to be guidedly raised and lowered with respect to the base plate 10 and suspended at convenient distances thereabove through the action of the suspending cables 24 and 25 and the before-mentioned counterweight.

A pipe 40 makes flanged connection as shown at 41 and 42 under an opening 43 which extends through the central portion of the base plate 10. The pipe 40 is adapted to make connection with a suitable vacuum pump (not shown) by means of which the chamber 12 formed within the bell jar 11 when it is sealed against the base plate 10 as shown in Figure 1, may be suitably evacuated.

Supported within the opening 43 upon the flange 44 of the pipe 40 is a small metal table 45 and in turn supported upon the top of the table 45 is a crucible or boat 46 adapted to contain a supply of a suitable coating material 47. A spiral, resistance heating element or filament 50 is provided for heating the material 47 in the crucible 46, by radiation, to a vaporizing temperature. The filament 50 is supported by and makes electrical connection at its opposite ends with a pair of supporting conductor arms 51 and 52 which in turn are supported by and make electrical connection with a pair of spaced terminals 53 and 54 which extend through the base plate 10 through suitable air-tight lead-in insulators as shown at 56 and 57. The terminals 53 and 54 make connection on the outside of the chamber by way of suitable conductors as shown at 58 and 59 with a source of electric current (not shown).

Secured to the base plate 10, within the contact area of the lower edge of the mouth of the bell jar 11 as shown at 60 and 61, are a pair of vertical standards 63 and 64 which make supporting connection at their upper ends with a ring member 65. A plurality of frame members 67 as best shown in Figure 2 extend radially between circumferentially spaced points of attachments to the ring member 65 and a central hub 68 to form a spider member for supporting the heating element as more fully described hereinafter.

A bushing 69 is threadedly connected as shown at 70 through the hub 68 and a shaft 72 extends through the bushing 69 and is rotatably supported therein as more fully described hereinafter.

Each of the radial members 67 of the heater element spider is provided with a plurality of spaced, stand-off insulators 75 attached to the lower surface thereof, to which is attached and about which is wound, in spiral arrangement, a suitable resistance-wire heating element 76. The opposite ends 77 and 78 of the wire heating element 76 make connection through suitable conductors diagrammatically shown at 79 and 80 respectively, to the before-mentioned terminal 53 and another terminal 82 which extends through the base plate 10 through a suitable air-tight lead-in insulator arrangement as shown at 83. The terminals 53 and 82 make connection by way of conductors 58 and 85 to a suitable, separate source of electric current whereby the upper heating element 76 may be controlled independently from that of the spiral heating element 50.

Referring again primarily to Figure 1, an element supporting mechanism or structure S is provided, the assembly of which is adapted to be detachably supported as a whole from the heater ring 65 by means of a plurality of hook members as shown at 90. The before-mentioned element supporting structure S comprises an outer ring 91, an inner gear box or housing 93 having a removable cover 94 and a plurality of radial, interconnecting members 92.

A ring gear 95 housed within the gear box 93, is fixed to a central shaft 96 which is, in turn, rotatably supported adjacent its upper end in an adjustable bushing 97 and at its lower end in an inwardly extending bearing 98 carried by the before-mentioned cover 94. The upward end of shaft 96 is provided with a cross pin 100 which, when the apparatus is assembled as shown in Figure 1, fits into and makes rotational coupling engagement with a pair of diametrally opposite slots in a coupling member 101 formed at the lower portion of the before-mentioned shaft 72.

A plurality of sloping, radially directed shafts extend outwardly, as shown at 105, through suitable bearing openings in the sides of the gear box 93, to suitable outer-end bearing members 106 carried by the ring 91. The inner ends of the shafts, as shown at 105 which extend into the gear box 93 each carry fixed thereto a pinion, as shown at 107, which make meshing engagement with the before-mentioned ring gear 95.

The radial shafts 105 have formed integral therewith, suitable means for holding objects to be coated, which by way of example in the present case, are adapted to retain disc shaped optical elements or lenses as shown at 110 in Figure 4. Each such holder comprises an outer ring shaped frame 111 carrying at one side a pair of fixed, inwardly projecting lugs as shown at 112 and at the diametrically opposite side a similar pair of inwardly projecting, movable lugs 113 attached to the outer surface of the ring 111 by means of a curved leaf spring 114.

A circular frame 115 is adapted to be detachably supported within the ring 111 between the before-mentioned lugs 112 and 113. The frame 115 is provided with a curved spring 116 attached at its mid-point as shown at 117 to the inner surface thereof. The curved spring 116 carries at its opposite outer ends a pair of V-shaped jaw members 118 and 119 adapted to make gripping engagement over the edge of the optical element or lens 110. Diametrically opposite the point of attachment 117 is an angle clip member 120 attached to the frame 115. The angle clip 120 is provided with a radially directed slot 121. A V-shaped jaw member 122 is attached to the outer end of and is slidably supported from the upper surface of the clip 120 by a slide plate 123. A bolt having a thumb screw as shown at 124 passes through a hole in the slide plate 123 and through the clip slot 123 and serves to supply means for adjusting the radial position of the jaw member 122 to suit the size of the optical element to be supported therein such as that shown at 110. The jaw element 122, as in the case of jaw elements 118 and 119, is adapted to fit over the edge of an optical element 110.

The shaft 72 having the before-described coupling member 101 at its lower end, as shown in Figure 1, extends upwardly through and is rotatably supported by the bushing 69 and is fixed in a hub 125 which is in turn attached to the center of an armature bar or rotor member 126 made of suitable ferro-magnetic material. The outer ends of the armature bar or rotor 126 are shaped or curved to conform with the curved inner surface of the dome of the bell jar 11 and are spaced in close proximity thereto, permitting just sufficient clearance for rotation about the axis of the shaft 72.

A pair of field electromagnets as shown at 129 and 130 are adapted to be rotated coaxially with shaft 72 and in close proximity to the outer surface of the dome of the bell jar 11, upon a field yoke member 131. The yoke member 131 is rotatably supported at its center section by a shaft 132 which is in turn rotatably journaled within a bearing 133 extending through and fixed to the central portion of the before-described supporting yoke 20.

A gear 135 is keyed to the field shaft 132 and is adapted to be driven by a pinion 136 and the shaft of an electric motor 137.

The field shaft 132 carries a pair of slip rings 138 and 139 insulated from one another and from the shaft 132 by a suitable insulating collar 140. The slip rings 138 and 139 are connected electrically to the series connected field electromagnets 129 and 130 by means of suitable conductors diagrammatically shown at 141, 142 and 143. A pair of brushes 145 and 146 make sliding contact with the outer surfaces of the slip rings and are supported by means of a standard 147 attached to the lower surface of the yoke 20. The brushes 145 and 146 are connected through conductors 150 and 151 to a suitable source of electric current (not shown) for energizing the field electromagnets 129 and 130.

The operation of the apparatus is as follows:

Assuming the apparatus to be assembled as illustrated in Figure 1 the bell jar 11 is first elevated and suspended a suitable distance above the base plate 10 by means of the supporting members 15 and 16, the yoke member 20 and cables 24 and 25, said elevation being sufficient to expose the optical element supporting structure S. The structure S may then be removed by reaching under the open end of the bell jar 11 and raising the structure S slightly and swinging the hook members 90 outward out of engagement with the ring 91, after which the element supporting structure S is free to be lowered and uncoupled from the shaft 72 and coupling 101. After removal of the element supporting structure S the clip frames 115 may be removed from the clip holder rings 111 and each clip holder ring loaded with an optical element to be coated such as, for example, the double convex lens illustrated at 110. After the clip frames have been loaded and replaced in the clip frame holders 111, the whole element supporting mechanism S is reinstalled in the apparatus illustrated in Figure 1 by first inserting the upper end of the shaft 107 and coupling pin 100 in to the coupling 101 and then swinging the hook members 90 inward into supporting engagement with the ring 91.

Next the crucible 48 may be filled, as shown at 47, with a suitable material from which the evaporative coating is to be formed and the crucible placed under the heating element 50. Next the bell jar 11 is lowered bringing the bottom end of the bell jar and the gasket 13 into sealing contact with the upper surface of the base plate 10. At this point evacuation of the chamber 12 through the connection 40 by means of a suitable vacuum pump (not shown) may be commenced and shortly thereafter the heating element 76 may be energized by applying a suitable current to the connections 58 and 85. At the same time the field electromagnets 129 and 130 are energized and the motor 137 may be started to cause the arm 131 and the field electromagnets 129 and 130 to rotate. Due to the magnetic attraction between the magnets 129 and 130 and the outer end of the armature bar 126 inside the bell jar, rotation of corresponding speed is imparted to the armature shaft 72 which, as hereinbefore described, is coupled by means of a pin connection 100 and coupling 101 to the shaft 107 and rotation is thereby transmitted through the ring gear 95 to the pinions 107 and thence to the shafts 105. The lens holders 111 carrying the optical elements 110 are thus caused to rotate about the axis of the shafts 105, thereby alternately exposing opposite surfaces of the optical element to the direct heat radiated from the heating element 76 thereabove.

When the vacuum has attained a suitable value and the temperature of the optical elements to be coated has been brought up to approximately 450° F. the heating element 50 may be energized by connecting the conductors 58 and 59 to a suitable source of electric current. The heating element 50 is thereby heated to incandescence and by the radiation therefrom the coating material 47 raised to its vaporization temperature.

The vapor issuing from the heated material 47 impinges on all of the surfaces in its direct path thus coating the exposed, hot surfaces of the optical elements 100 as they rotate with the holders 111. As hereinbefore mentioned, it has been found that a minor portion of the vapors being emitted from the heated source material 47 undergoes a certain amount of diffusion by reason of impacts with residual air molecules in the evacuated chamber and a small percentage of the vapors thus apparently reach the surfaces of the optical elements 110 by indirect paths and a small percentage of the coating may be formed in this way on the surface of the optical elements which are facing away from the source 47 during rotation. However, as contrasted with the usual practice of holding the elements stationary while complete deposition takes place on the surface facing the source material and at the same time a substantial layer of secondary material is deposited or certain other detrimental effects occur on the surface of the lens facing away from the source, here the optical surfaces are constantly rotated, as before described, thus preventing any material accumulation of secondary coating material on the surfaces and minimizing any other detrimental modification of the surface characteristics. That portion of the coating material which does reach surfaces of the optical elements indirectly is thereby apparently progressively intermixed with or modified in form by the greater percentage of the materials which reach the surfaces directly and direct deposition is initiated on all surfaces before any other detrimental alterations of the surfaces upon which the coating is to be formed can take place.

The heating of the optical element, the evacuation of the chamber and vaporization of the coating material are simultaneously continued until a suitable layer of the desired thickness of the coating material has been deposited on the several surfaces of the optical element. Upon completion of the coating the heating element 50 is disconnected from the current source and the heating filament 76 may also be disconnected from its current source at the same time or a suitable time interval thereafter. The optical elements are preferably first permitted to cool somewhat while maintaining the vacuum and then the vacuum is slowly reduced.

After completion of the coating processes as hereinbefore described and after the vacuum in the chamber 12 has been reduced to atmospheric pressure the bell jar 11 may then be elevated from the base 10 and the element supporting mechanism S removed, after which the clip frames 115 may be removed from the clip frame holders 111 and the optical elements 110 removed from the clips.

Suitable dimensions and operating characteristics under which apparatus of the type hereinbefore described has been successfully operated are as follows: The heating filament 50 may be made of No. 020 tungsten wire and wound in a spiral of four turns having outer diameter of ⅝ inch and an approximate average diameter of $\frac{5}{16}$ inch. Sufficient current is supplied to the filament 50 to heat it to a brilliant incandescence. A current of from 21.0 to 24.4 amperes at from 13.6 to 17.7 volts respectively has been found satisfactory. The heating filament 50 may be placed approximately ⅛ to ¼ inch above the upper surface of the material 47, in the case of magnesium fluoride, which is to be heated and evaporated.

The optical element supporting structure S may be located above the crucible 46 in such a position as to place the surfaces of the optical elements 110 in place in the clip frame support at a distance of approximately 17 inches from the vapor source.

The heater element 76 may be placed above the optical element supporting apparatus in such a position that the heating element wires are approximately 2 inches above the optical elements on the average during their rotation. The heating element 76 may be made of No. 040 nichrome resistance wire and of such a length as to consume approximately 15 amperes at 100 volts.

In operation the heating element 76 is controlled so as to heat the optical elements being coated to a temperature of about 450° F. and the optical elements are rotated at approximately 50 revolutions per minute during the heating and coating processes. The vacuum in chamber 12 is preferably maintained between approximately $4 \times 10^{-4}$ to $5 \times 10^{-6}$ millimeters of mercury during the depositing stage. Ordinarily the source material for vapors, shown at 47, comprises magnesium fluoride but the process and apparatus of this invention may be advantageously employed similarly for other coating materials such as for example various other metallic fluorides such as those of sodium, lithium and calcium, also cyrolite (sodium-aluminium fluoride), zinc sulphide, lead sulphide and quartz. Metals such as silver, aluminium, copper and chromium may also be deposited.

The progress of film deposition on an optical surface in accordance with this invention may be determined by observing the color of the light reflected therefrom as is now well known in this art.

It is to be understood that the foregoing is illustrative of but one apparatus and that the invention is not limited thereby but may include various modifications and changes made by those skilled in the art without departing from the spirit and scope of the invention as defined in the appended claims.

We claim:

1. A process for evaporative coating of object surfaces in vacuum comprising: supporting on a substantially horizontal axis an object to be coated in an evacuated chamber; evaporating coating material in said evacuated chamber at a source point below said object; continuously rotating said object about said axis at about 50 R. P. M. in said chamber during said evaporation to expose directly different portions of the surfaces of said object alternately to said vapors emanating from said source below and to radiant heat from a source located above said object, said radiant heat maintaining said object at a temperature of approximately 450° F.

2. Apparatus for evaporative coating of object surfaces in vacuum comprising: a base member; a bell type container open at its bottom and forming, when said open end is in sealed engagement with said base member, a chamber adapted to be evacuated; means for emitting coating vapors in the lower portion of said chamber adjacent said base member; an upright standard on said base member and extending into the upper portion of said container; an element-supporting assembly detachably supported by and positioned adjacent the upper end of said standard, said assembly including therein a plurality of holders for objects to be coated rotatably journaled thereto and a first shaft rotatably mounted in said assembly and coupled to said holders for rotation thereof; a second shaft rotatably supported by said standard; a detachable coupling between said first and second shafts, said element-supporting assembly being thereby adapted to be detached from said standard and removed from said chamber when said container is elevated from said bodies; an armature coupled to said second shaft and positioned for rotation with said shaft within and adjacent the upper end of said container; a frame fixed to the exterior of said container; power means mounted upon said frame; magnetic means mounted upon said frame and rotatable by said power means adjacent the upper exterior surface of said container in magnetic coupling relationship with said armature; and means for elevating said frame, power means and container as a unit from contact with said base member.

3. Apparatus according to claim 2 and a heating coil fixed to the upper end portion of said standard, above said detachable element-supporting assembly.

OSCAR VAN LEER.
MORRIS A. ZOOK, JR.

REFERENCES CITED

The following references are of record in the file of this patent:

UNITED STATES PATENTS

| Number | Name | Date |
|---|---|---|
| 2,260,471 | McLeod | Oct. 28, 1941 |
| 2,351,537 | Osterberg | June 13, 1944 |
| 2,383,470 | Morgan | Aug. 28, 1945 |
| 2,398,382 | Lyon | Apr. 16, 1946 |
| 2,408,614 | Dimmick | Oct. 1, 1946 |
| 2,414,406 | Colbert | Jan. 14, 1947 |